United States Patent
Plotkin et al.

(10) Patent No.: US 7,593,532 B2
(45) Date of Patent: Sep. 22, 2009

(54) MANAGEMENT OF THE RETENTION AND/OR DISCARDING OF STORED DATA

(75) Inventors: Serge Plotkin, San Carlos, CA (US); Hristo Iankov Bojinov, Mountain View, CA (US); Kevin Brown, Atherton, CA (US)

(73) Assignee: NetApp, Inc., Sunnyvale, CA (US)

( * ) Notice: Subject to any disclaimer, the term of this patent is extended or adjusted under 35 U.S.C. 154(b) by 910 days.

(21) Appl. No.: 10/830,580

(22) Filed: Apr. 22, 2004

(65) Prior Publication Data

US 2005/0238175 A1 Oct. 27, 2005

(51) Int. Cl.
*H04L 9/00* (2006.01)
*G06F 12/14* (2006.01)

(52) U.S. Cl. .................. 380/284; 380/45; 713/165; 713/193

(58) Field of Classification Search .................. 380/45, 380/281, 284
See application file for complete search history.

(56) References Cited

U.S. PATENT DOCUMENTS

| | | | |
|---|---|---|---|
| 4,558,176 A | | 12/1985 | Arnold et al. |
| 5,237,614 A | * | 8/1993 | Weiss ..................... 713/159 |
| 5,677,952 A | | 10/1997 | Blakley, III et al. |
| 5,870,468 A | | 2/1999 | Harrison |
| 5,915,025 A | * | 6/1999 | Taguchi et al. .............. 380/44 |
| 5,933,498 A | | 8/1999 | Schneck et al. |
| 5,940,507 A | | 8/1999 | Cane et al. |
| 6,199,163 B1 | | 3/2001 | Dumas et al. |
| 6,249,866 B1 | | 6/2001 | Brundrett et al. |
| 6,292,899 B1 | | 9/2001 | McBride |
| 6,296,191 B1 | * | 10/2001 | Hamann et al. ............ 235/492 |
| 6,307,936 B1 | * | 10/2001 | Ober et al. .................. 380/30 |
| 6,705,983 B1 | | 3/2004 | Rochat |
| 6,907,127 B1 | * | 6/2005 | Kravitz et al. .............. 380/277 |
| 6,938,162 B1 | | 8/2005 | Nagai et al. |
| 6,975,728 B1 | * | 12/2005 | Eye et al. ................... 380/277 |
| 6,986,043 B2 | | 1/2006 | Andrew et al. |
| 6,993,661 B1 | * | 1/2006 | Garfinkel .................. 713/193 |
| 7,003,674 B1 | | 2/2006 | Hamlin |
| 7,010,720 B2 | * | 3/2006 | Maeda et al. ................. 714/7 |
| 7,023,998 B2 | | 4/2006 | Garay et al. |
| 7,062,045 B2 | * | 6/2006 | Riddick et al. ............... 380/44 |
| 7,215,771 B1 | | 5/2007 | Hamlin |
| 7,463,739 B2 | * | 12/2008 | Couillard .................. 380/284 |
| 2001/0009580 A1 | | 7/2001 | Ikeda |
| 2002/0015494 A1 | * | 2/2002 | Nagai et al. ............... 380/201 |

(Continued)

FOREIGN PATENT DOCUMENTS

EP 1 058 254 A3 11/2001

(Continued)

OTHER PUBLICATIONS

"IEEE 100, The Authoritative Dictionary of IEEE Standards Terms, seventh edition", p. 872, copyright 2000.*

(Continued)

*Primary Examiner*—Ponnoreay Pich
(74) *Attorney, Agent, or Firm*—Cesari and McKenna, LLP

(57) ABSTRACT

Embodiments of methods, devices and/or systems for a method of managing the retention and/or discarding of stored data are described.

23 Claims, 6 Drawing Sheets

U.S. PATENT DOCUMENTS

| | | | |
|---|---|---|---|
| 2002/0016919 | A1 | 2/2002 | Sims, III |
| 2002/0107892 | A1* | 8/2002 | Chittu et al. ............... 707/514 |
| 2003/0110131 | A1* | 6/2003 | Alain et al. .................. 705/51 |
| 2004/0086125 | A1* | 5/2004 | Lain et al. ................... 380/277 |
| 2004/0151319 | A1* | 8/2004 | Proudler ..................... 380/277 |
| 2005/0018853 | A1* | 1/2005 | Lain et al. ................... 380/277 |
| 2005/0271210 | A1* | 12/2005 | Soppera ...................... 380/277 |

FOREIGN PATENT DOCUMENTS

| | | |
|---|---|---|
| EP | 1 450 362 A2 | 8/2004 |
| WO | WO 00/017731 | 3/2000 |
| WO | WO 00/67257 A3 | 11/2000 |

OTHER PUBLICATIONS

NeoScale Systems, Inc., http://www.neoscale.com, Copyright 2004, 2 Pg.

Federal Information Processing Standards Publication 1981 Guidelines for Implementing and Using the NBS Data Encryption Standard. Apr. 1, 1981. Federal Information Processing Standards Publication 74.

Security Requirements for Cryptographic Modules. Federal Information Processing Standards Publication 140-1. Jan. 11, 1994.

TCFS: Transparent Cryptographic File System. Ermelindo Mauriello. Linux Journal #40 Aug. 1997.

Vormetric—Securing Enterprise Data, retrieved from http://www.vormetric.com on Apr. 22, 2004, 2 pages.

Kasten Chase, Assurency SecureData, retrieved from http://www.kastenchase.com/index.aspx?id=35 on May 10, 2004, 3 pages.

Gibson et al., "File Server Scaling with Network Attached Secure Disks", by Department of Electrical and Computer Engineering of Carnegie Mellon University, published by ACM, Inc. in 1997, pp. 272-284.

Blaze, Matt, "A Cryptographic File System for Unix", AT&T Bell Laboratories, published at 1$^{st}$ Conference of Computer and Comm. Security, Nov. 1993, pp. 9-16.

Garay et al., "Secure Distributed Storage and Retrieval", published by Information Sciences Research Center, Bell Laboratories and IBM T.J. Watson Research Center in 1997, 24 pages.

Comba, Paul G., Approaches to Cryptographic Key Management, ACM 0-89791-251-9/86/0900-0038, 1986, pp. 38-45.

Clark, Andrew J., Physical Protection of Cryptographic Devices, Lecture Notes in Computer Science, Advances in Cryptology - Eurocrypt 1987, Amsterdam, the Netherlands, Apr. 13-15, 1987 Proceedings, pp. 83-93.

Weingart, Steve H., Physical Security for the µABYSS System, Proceedings from 1987 IEEE Symposiumon Security and Privacy, Apr. 27-29, 1987, Oakland CA, pp. 52-58.

Flavin, et al., Data Protection on Magnetic Media Via an Encrypting Controller, IBM Technical Disclosure Bulletin, vol. 30, No. 3, Aug. 1987, 2 pages.

Slusarczuk, Et Al., Emergency Destruction of Information Storing Media, Published by the Institute for Defense Analysis, Dec. 1987, 198 pages.

Johnson, Et Al., Self-Destructing Diskette, IBM Technical Bulletin, vol. 33, No. 1A, Jun. 1990, 2 pages.

Mallett, Patrick W., Considerations for Applying Disk Encryptors to Environments Subject to Hostile Overrun, IEEE 0-8186-2280-6/91, 1991, 5 pages.

Blaze, Matt, Key Management in an Encrypting File System, Conference Proceedings: USENIX Summer 1994 Technical Conference, Boston, MA Jun. 6-10, 1994, pp. 27-35.

Stinson, Douglas R., Cryptography: Theory and Practice, CRC Press, Mar. 1, 1995, 228 pages.

Yee, et al., Secure Coprocessors in Electronic Commerce Applications, Proceedings from First USENIX Workshop of Electronic Commerce, Jul. 11-12, 1995, New York NY, pp. 155-170.

Gutmann, Peter, Secure Deletion of Data from Magnetic and Solid-State Memory, Proceedings of the Sixth Annual USENIX Security Symposium: focusing on Applications of Cryptography, Jul. 22-25, 1996, San Jose, California, pp. 77-89.

Gobioff, et al., Smart Cards in Hostile Environments, Proceedings of the Second USENIX Workshop on Electronic Commerce, Nov. 18-21, 1996, Oakland, CA, pp. 23-28.

Gobioff, et al., Security for Network Attached Storage Devices, School of Computer Science, Carnegie Mellon University, Oct. 23, 1997, 20 pages.

Whitten, et al., Usability of Security: a Case Study, Contract No. 102590-98-C-3513 from the U.S. Postal Service, Dec. 18,. 1998, 39 pages.

Zadok, et al., Cryptfs: a Stackable Vnode Level Encryption File System, Computer Science Department, Columbia University, 1998, 14 pages.

Di Crescenzo, et al., How to Forget a Secret, STACS 99: 16$^{th}$ Annual Symposium on Theoretical Aspects of Computer Science, Trier, Germany, Mar. 4-6, 1999 Proceedings, pp. 500-509.

Gobioff, Howard, Security for a High Performance Commodity Storage Subsystem, School of Computer Science, Carnegie Mellon University, Jul. 1999, 222 pages.

Disappearing Inc. Makes Old Email Vanish Everywhere; Reduces Corporation Liability as well as Improves Corporate Productivity by Enabling Sensitive Communications via Email - Company Business and Marketing, published by Edge: Work-Group Computing Report, Oct. 11, 1999, retrieved from http://findarticles.com/p/articles/mi_m0WUB/is_Oct_11/ai_56260487/print, 1 page.

Smith, S.W., Verifying Type and Configuration of an IBM 4758 Device, IBM T.J. Watson Research Center, Feb. 8, 2000, 7 pages.

Provos, Niels, Encrypting Virtual Memory, CITI Technical Report 00-3, Apr. 25, 2000, 11 pages.

Cattaneo et al., The Design and Implementation of a Transparent Cryptographic Filesystem for UNIX, Proceedings of the FREENIX Track, 2001 USENIX Annual Technical Conference, Jun. 25-30, 2001, Boston, MA, 19 pages.

Garfinkel, et al. Remembrance of Data Passed: A Study of Disk Sanitation Practices, Published by the IEEE Computer Society, 1540-7933/03, 2003, pp. 17-27.

Patent Local Rule 4-3 Joint Claim Construction and Prehearing Statement (with Exhibits), filed in United States District Court for the Eastern District of Texas, Texarkana Division, Civil Action No. 5:07-cv-0019 (DJF), 28 pages, Jun. 12, 2008.

Plaintiff's Opening Claim Construction Brief for U.S. Patent 6,993,661 (with Exhibits), filed in United States District Court for the Eastern District of Texas, Texarkana Division, Civil Action No. 5:07-cv-0019 (DJF), Mar. 11, 2008, 170 pages.

Defendants' Claim Construction Brief, filed in United States District Court for the Eastern District of Texas, Texarkana Division, Civil Action No. 5:07-cv-0019 (DJF), Mar. 25, 2008, 23 pages.

Declaration of Jeffrey G. Homrig in Support of Defendants' Claim Construction Brief (with Exhibits), filed in United States District Court for the Eastern District of Texas, Texarkana Division, Civil Action No. 5:07-cv0019 (DJF), Apr. 3, 2008, 35 pages.

Plaintiff's Reply Claim Construction Brief for U.S. Patent 6,993,661 (with Exhibits), filed in United States District Court for the Eastern District of Texas, Texarkana Division, Civil Action No. 5:07-cv-0019 (DJF), Apr. 3, 2008, 35 pages.

Plaintiff Simson Garfinkel's and Defendants Decru, Inc. And Network Appliance Inc.'s Joint Claim Construction Chart, filed in United States Patent and Trademark Office on Jun. 23, 2008, 14 pages.

Claim Construction Order, filed in United States District Court for the Eastern District of Texas, Texarkana.

Ex Parte Reexamination Communication Transmittal Form, for U.S. Appl. No. 90/009,152, mailed by United States Patent and Trademark Office on Jun. 23, 2008, 14 pages.

Information Regarding Related Litigation, filed in the United States Patent and Trademark Office in U.S. Appl. No. 90/009,152, Re-examination of Patent No. 6, 993,661, Mar. 4, 2009, 2 pages.

Response to First Office Action, filed in the United States Patent and Trademark Office in U.S. Appl. No. 90/009,152, Re-examination of Patent No. 6,993,661, Apr. 6, 2009, 47 pages.

"Avoid Litigation: Encrypt Your Data", InfoTech Research Group, Sep. 19, 2006, 6 pages.

* cited by examiner

MANAGEMENT OF THE RETENTION AND/OR DISCARDING OF STORED DATA

BACKGROUND

This disclosure is related to the management and/or discarding of stored data.

One difficulty with state of the art technology relates to the ability to manage the retention and/or the discarding of data that has been stored, such as on a computing platform and/or on a storage area network, for example. If the stored data is contained in an electronic file, for example, deleting the file may not delete the stored data. It may be possible, depending at least in part on the system architecture and/or file management system, to recover the file that has been deleted. In some circumstances, this may be undesirable, such as where the information relates to commercial secrets that a company or other entity would like to permanently discard.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

One difficulty with state of the art technology relates to the ability to manage the retention and/or the discarding of data that has been stored, such as on computing platforms, storage area networks, storage arrays (e.g., EMC, DMX), file servers (e.g., Windows 2003), and/or filers (e.g., Net App filer), for example. If the stored data is contained in an electronic file, for example, deleting the file may not delete the stored data. It may be possible, depending at least in part on the system architecture and/or file management system, to recover the file that has been deleted. In some circumstances, this may be undesirable, such as where the information relates to commercial secrets that a company or other entity would like to permanently discard. One possible approach is to find all file fragments (including the file copies in backups, disaster recovery locations, etc) and overwrite each fragment several times with random and/or non-random data. This approach is usually impractical and/or time consuming.

Figure 1:
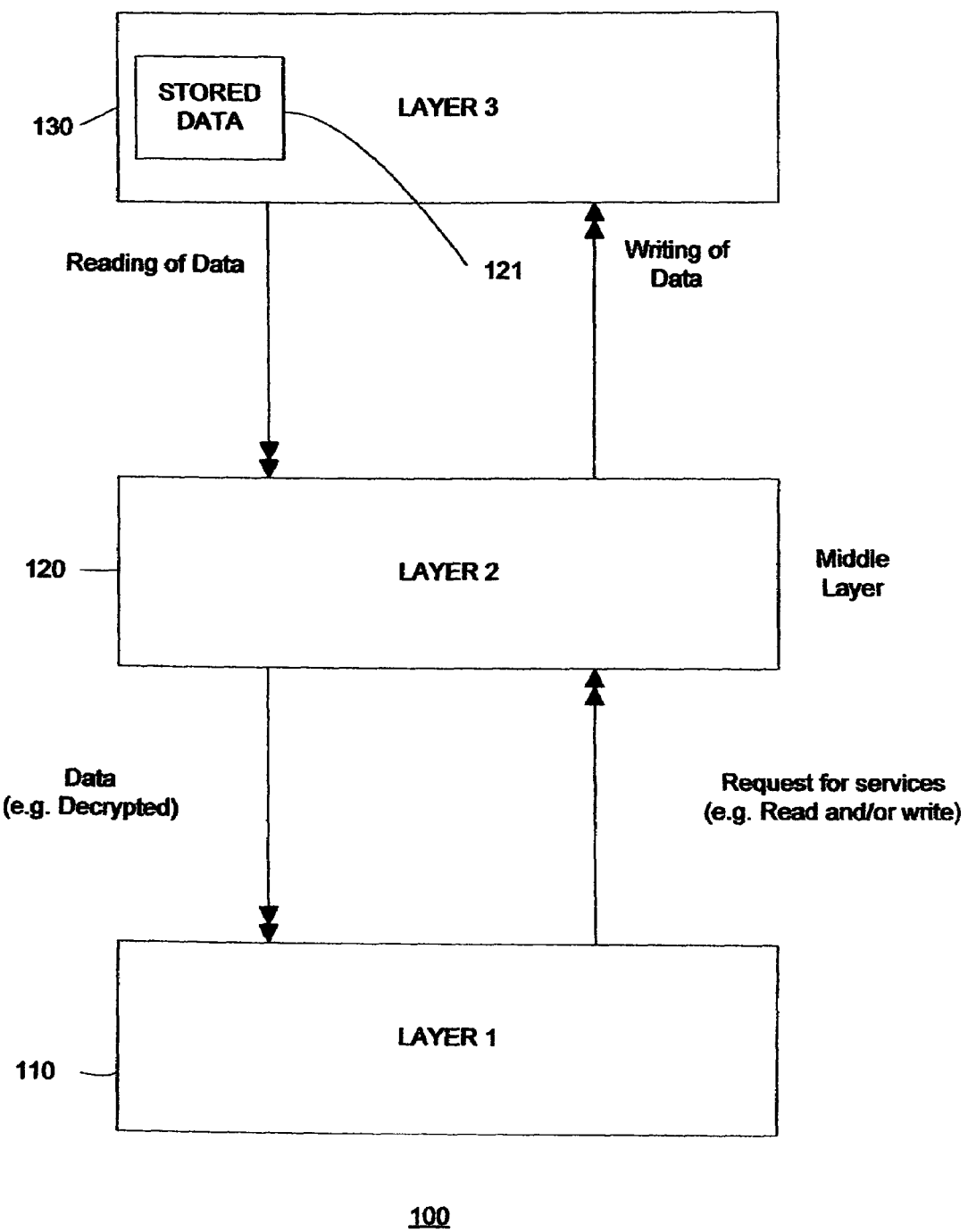
FIG. 1 is a schematic diagram illustrating an embodiment of a typical architecture in which an embodiment of a method of managing the retention and/or discarding of stored data may be implemented.

FIG. 1 is a schematic diagram illustrating a typical architecture in which an embodiment of a technique to manage the retention and/or discarding of stored data may be implemented, although the claimed subject matter is not limited in scope to this particular architecture. In this particular embodiment, FIG. 1 includes a first layer 110, a second layer 120 and a third layer 130. Thus, for this particular embodiment, first layer 110 may make a request for services, such as that data be written and/or read. Second layer 120 may receive the request and may then fulfill it, assuming, for example, that it is able to do so. There are a variety of services that may be provided by second layer 120. Frequently such services are data-related, such as authentication, authorization, and/or data storage and/or retrieval, although these are just examples.

In this particular approach, layer two (also referred to as second layer 120) may supplement or enhance services that may be available from layer three (also referred to as third layer 130). Again, although the claimed subject matter is not limited in scope to this approach or architecture, it is, nonetheless, a common one. For example, web proxy servers may employ this approach or architecture. One service that might also be provided by layer two includes security. For example, this may include firewall functionality, such as packet filtering, packet inspection (e.g., stateful and/or stateless), packet format validation, terminating IPSec connections, and/or the like. Another service that might be provided includes data encryption and/or decryption, as explained in more detail hereinafter. Without loss of generality, in this context, encryption includes a process in which data is coded so that the content of the data is not capable of being employed or understood by a person or a device without first being decoded back to the previous form or format it had prior to being encrypted. Thus, decryption, in this context, includes a process of decoding encrypted data back to the form or format it had prior to encryption.

Thus, in this particular example, if first layer 110 requests that data be written, second layer 120 may encrypt the data to be written. The data, once encrypted, may be stored by or at a third layer, such as 130. This is illustrated in FIG. 1 by 121. Likewise, second layer 120 may, upon another request for services by first layer 110, such as a read request, retrieve the stored, encrypted data from layer three, decrypt it, and provide it to first layer 110. One potential advantage of an embodiment, such as previously described, is that encryption and/or decryption of the data may be made transparent to third layer 130, although it is not necessary that this be the case, even for this embodiment and, thus, the claimed subject matter is not limited in scope to embodiments where this is so. Likewise, although the claimed subject matter is not limited in scope in this respect, the encryption may be also made transparent to layer 1, e.g., the "consumer" of the services. Likewise, in another embodiment, any two layers, such as layer 1 and layer 3, may reside on the same computing platform and even comprise the same layer in some embodiments, although the claimed subject matter is not limited in scope in this respect, of course. Nonetheless, for such an embodiment, the encryption and/or decryption of data stored at or on third layer 130 will not impact the operation of layer 130. In this example embodiment, layer 130 treats the data substantially the same regardless of whether or not the data is encrypted. This may provide some benefits, such as making interoperability with other systems possible. Of course, this is just one example of an embodiment of a technique for managing the retention and/or discarding of stored data and, as previously stated, the claim subject matter is not limited in scope to such an embodiment.

The following discussion details several possible embodiments for accomplishing this, although these are merely examples and are not intended to limit the scope of the claimed subject matter. As described above, under some circumstances it may be desirable to discard stored data and have the data discarded in a manner so that it may not practicably be recovered. In this context, the term discard includes a practical inability to recover the data that has been discarded. Due at least in part to the frequency in which users of today's computing platforms tend to store files, such as spread sheets, word documents, e-mail and the like, multiple copies of such documents typically will exist on a variety of storage media and/or computing platforms. Likewise, additional copies may include tape backups, disaster recovery, local backups, etc. Thus, it may be extremely difficult, if not nearly impossible, with this type of behavior on the part of users, to discard a file. Likewise, even if there are no remaining copies of a specified file, meaning that they have all effectively been "deleted," on some computing platforms a file or other stored data is "deleted" simply by marking it "deleted," but the storage media is not "cleaned" by writing over the data so that it may no longer be recovered. For example, in some operating systems, such as "Data On Tap" produced by Network Appliance, sometimes new data does not overwrite prior data. Instead, a new sector of a disk or other storage media is written to and, thus, logically overwritten data is still possible to recover from the physical medium (e.g. hard disk), and in addition, deleted files are not necessarily overwritten. This may allow others, therefore, to recover data that has been stored and deleted.

Again, today's document retention policies in a variety of contexts make it desirable to be able to discard stored data at specific instances or times. In one embodiment of a method of discarding stored data, a key that was previously used to encrypt the stored data is discarded. In this context, a key includes any set of symbols, typically in the form of bits or bytes of data, employed to encrypt and/or decrypt a set of data using any currently known or to be later developed encryption technique. Likewise, depending at least in part on the context, the term key may be used to refer to multiple keys. To discard a particular file or data set, the key used to encrypt this file or data set can be discarded. In this context, the term data set or set of data is intended to encompass any and all data storage, regardless of form, either currently known or to be later developed. Thus, this may include, for example, a file, a portion of a file, a sector or partition of a disk or LUN, a region of a database and/or any combinations thereof. Likewise, it may include storage on any type of media, such as CD-ROM, disk, flash memory, etc., and/or in any physical form, such as electronic signals, optical signals, etc., whether currently known or to be later developed. Furthermore, discarding of the key may be accomplished in any one of a number of ways.

For example, a key may be stored on a particular media and the media may be discarded in some fashion or otherwise permanently destroyed. Once this happens, if a sufficiently strong encryption is employed, for example, it is not practicable to recover the data. Thus, for an embodiment of a system for retaining and/or discarding stored data, if it is desired that ease of administration be present, the same key may be employed for all files and, hence, discarding the key in the manner previously described results in discarding the stored data in files that have been encrypted with that key.

As alluded to above, the key may be stored on conventional media, such as a disk, CD-ROM, floppy disks, or on printed paper, for example. Thus, simply discarding this media or permanently destroying the media discards the key, as is desired. Alternatively, a protected form of media may be employed, such as a smart card, tamper resistant hardware, or the like. Such a medium of storage or piece of hardware, for example, may have the capable to keep a key relatively secure and may also include the capability to when instructed physically "delete" the key so that it is at least practically not recoverable from the media or hardware and is, therefore, discarded. Here, again, destroying the protected media ultimately discards the data. It may be worth noting, in this context, that, depending upon the particular operating system and/or computing platform, storing the key with the encrypted data may make it difficult to successfully discard the stored data that has been encrypted. Again, as previously described above, for the stored data to be discarded, if the key has also been stored in a device that supports snapshots (e.g., Network Appliances filer), it is practically difficult to erase the stored key by writing over the locations that contain the key. It is likewise noted that where the key has been stored in multiple locations, it is, of course, desirable to discard or permanently destroy those multiple copies.

If better granularity is desired, in an alternative embodiment, each file may be assigned a separate and distinct key, for example. In this example, discarding a key results in the data stored in the associated file likewise being discarded. One disadvantage of this approach, however, is that saving the key separately from the file, such as in flash memory or a proxy device, for example, may mean that a large additional amount of memory will be employed, e.g., to support a large number of files. Likewise, as indicated above, storing the key in the file and/or together with the file may make it difficult to discard the key.

Figure 2:
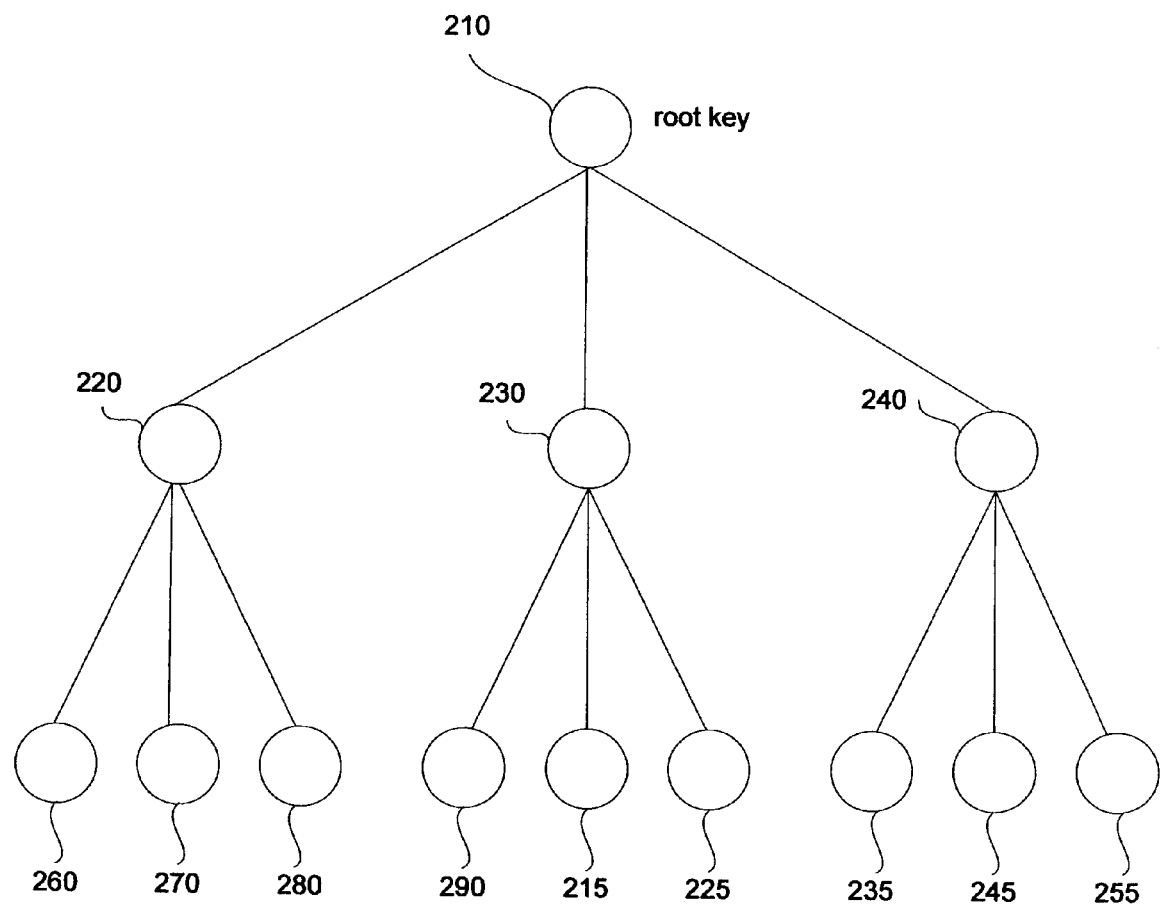
FIG. 2 is a schematic diagram illustrating an embodiment of a tree hierarchy for a set of keys for an embodiment of a method of managing the retention and/or discarding of stored data.

In yet an alternate embodiment, a hierarchical key scheme may be employed in which one or more keys may be manipulated to efficiently discard data. In this particular context, manipulating may include discarding at least one of the keys in the hierarchy and/or it may include changing at least one of the keys in the hierarchy. Here, the hierarchy has a tree structure, although the claimed subject matter is not limited in scope in this respect. FIG. 2 is a schematic diagram illustrating one embodiment of such a key hierarchy. In this particular embodiment, a "root key" includes a key at a top of a hierarchy. Retention key(s) include(s) key(s) that are at least one step removed from a root key. Three retention keys, for example, are designated by nodes 220, 230 and 240 in FIG. 2. Likewise, here, the file keys are one level removed from the retention keys, although, of course, the claimed subject matter is not limited in scope in this respect. For example, several additional layers of retention keys may separate the file keys from retention keys 220, 230, and 240. Here, however, the file keys are designated by nodes 260, 270, 280, 290, 215, 225, 235, 245 and 255. Likewise, additional layers of files and file keys may be present in which file keys higher in the hierarchy operate as retention keys for files lower in the hierarchy.

In this particular hierarchical structure, the root key designated by node 210 in FIG. 2 is used to encrypt and/or decrypt the retention keys, designated by 220, 230 and 240. Likewise, the retention keys are, in turn, used to encrypt and/or decrypt the file keys that here are one step removed from these retention keys. Therefore, retention key 220 is employed to encrypt file keys 260, 270 and 280. Likewise, retention key 230 is employed to encrypt file keys 290, 215 and 225. Furthermore, retention key 240 is used to encrypt file keys 235, 245 and 255. In this particular embodiment, therefore, the file keys may be stored together with the file data. Thus, for this particular embodiment, the root key and retention keys are stored separately.

For this particular embodiment, therefore, if it is desired to discard the data contained in the files, for example, the root key may be discarded, such as by permanently destroying the media in which it is stored, as previously described, for example, in connection with other embodiments. Alternatively, if a particular set of files are to be discarded, then the particular retention key for those files may be discarded. For example, if it is desired to discard the files that correspond to file keys 260, 270 and 280, then retention key 220 may be discarded. Likewise, if it is desired to discard a single file (e.g. the one that uses key 270), then a new retention key is created, all files that we desire to keep (260, 280) have their file keys re-encrypted with the new retention key, and the old one is deleted.

In the approach described above, although, of course, the claimed subject matter is not limited in scope to this embodiment, it should be clear that a file is decrypted by identifying the appropriate retention key, using the root key to decrypt the retention key. using the decrypted retention key to decrypt the file key and using the decrypted file key to decrypt the stored encrypted data. In one particular embodiment, for example, an index of files associated with a retention key may be stored in metadata as well as the encrypted file keys. Likewise, as previously suggested, the root key may be used to encrypt the retention keys and may be stored separately.

Although the previously described embodiment illustrates a key hierarchy with three levels, in an alternative embodiment, as previously suggested, the number of levels to be employed is not restricted. Likewise, in an alternative embodiment, the hierarchy may not have a pure tree-like structure or a structure that even resembles a tree. For example, in another implementation, the file key may be encrypted once with its retention key and once with the root key.

Likewise, in one embodiment, keys at different levels may be encrypted by keys from a prior level or such keys may be stored in plain text depending upon the approach that is desired. If a key resides in tamper-resistant hardware, it may be stored in "cleartext" to simplify implementation. In this context, cleartext refers to storing the data in the form that ultimately is used for data processing, rather than storing the data in a form that is decrypted before use. It may be desirable, for example, for the root key to be in "cleartext" inside a tamper-proof hardware module. Each time a decryption operation is performed, in one possible embodiment; this key may be used to decrypt appropriate sets of keys from the hierarchy to use those keys to decrypt the file or data set. In addition, it may be possible for there to be several "root" keys. Also, in an embodiment, instead of using the key from the previous level, one could use one or more keys from multiple levels above to encrypt the key at the current level. Thus, depending, of course, upon the particular context, it might be beneficial for some of the keys to not be encrypted by a key in such an embodiment. Likewise, the keys may be stored as part of an encrypted file, separately from the file but on the same media, on separate (conventional) media, or on separate protected media, for example, such as previously described.

With such a system, data (including key data), may be discarded by discarding the key used to encrypt it. It may also now be appreciated that a tree hierarchy, as previously described, may be implemented seamlessly in some embodiments. For example, if it desired to discard particular files, those files may be "deleted" and reside in the recycle bin. Thus, in one embodiment, a computer platform may be configured to automatically cycle through the files that have not been designated as "deleted," re-encrypt those files keys with one or more new retention keys, and then discard one or more prior retention keys. If a file is encrypted with a "file key," the file key may be encrypted with a retention key also stored in the file metadata. Thus, to discard files, a new retention key may be selected and used to re-encrypt the file keys of the files that one would like to retain. This might be advantageous since re-encrypting a file key is typically more convenient than re-encrypting a file. In an alternative embodiment, the file key (encrypted with a retention key or some other set of keys in a hierarchy) might reside on a different file system/device/array/etc. than the file itself. In this case, by re-encrypting the file key, one can effectively discard a file or files even if these files reside on a Write-Once-Read-Many (WORM) device or any other device that does not support writing over previously written data (e.g. Network Appliance's Snap-Lock device). Likewise, in still another embodiment, a "history" of recently "deleted" retention keys may be retained to facilitate recovery from erroneous deletions. Such recently deleted keys can be periodically purged.

As will now be appreciated, any system of key dependencies is included within the scope of the claimed subject matter. The prior description merely describes several potential embodiments. Thus, in yet another embodiment, a hierarchy of keys may topologically comprise a directed acyclic graph, potentially with several "root" nodes, e.g., nodes without incoming edges, as illustrated, for example, in FIG. 6. In such an embodiment, each node may correspond to a key, and a key may be stored with other keys, depending upon the particular embodiment, corresponding to some or all of the nodes that have outgoing edges pointing to the node corresponding to this key. Likewise, this key may be stored as an encrypted key. In this particular embodiment, a key may be encrypted with those keys corresponding to the parent nodes. Thus, typically, in such an embodiment, keys except root key(s) are stored encrypted. The keys in the middle of the hierarchy or graph or at the "leaves," which correspond to nodes of a tree with no outgoing edges, are decrypted as appropriate for use. Likewise, in this embodiment, to decrypt a key involves decrypting its parents.

Instead of deleting data, such as a partition of a disk or LUN, a fraction of a file, a storage region where a certain part of a database is stored, and/or a collection of any of the above, it is sufficient to discard the associated keys. One may either discard the key used to encrypt the data, or its parent keys in the hierarchy, or parents of parents, etc. In graph-theoretic terms, for this particular embodiment, it is sufficient to delete any node on one of the paths from a root to the node to be discarded. However, discarding the key associated with a node in the hierarchy, for this embodiment, discards its children. To discard some of its children, a new key for the associated node may be created and the children to be retained may be re-encrypted with this new value. Likewise, as previously alluded to, data may be discarded based at least in part on a number of parameters, such as, for example, time, type of file, storage location, size of file, keywords in the file, etc.

Figure 6:
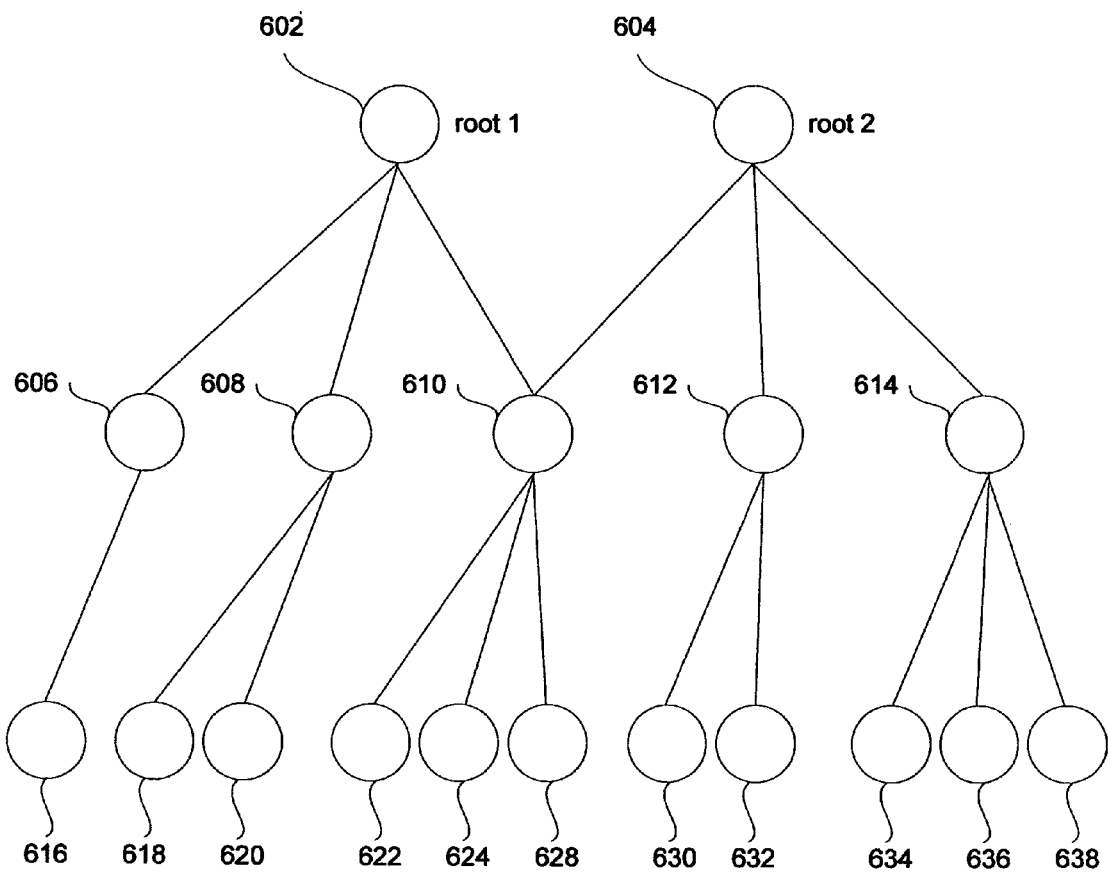
FIG. 6 is a schematic diagram illustrating another embodiment of a hierarchy for a set of keys for an embodiment of a method of managing the retention and/or discarding of stored data.

The embodiment immediately described above provides a system in which a key in a tree hierarchy depends on the keys pointing to it and the keys that point to those keys, as shown, for example, in FIG. 6, referred to here as an "AND" scheme. An alternative scheme may comprise one in which a key may be recovered as long as there is at least one path from the root that has not been discarded, referred to here as an "OR"

scheme. Thus, depending on the particular embodiment, a mix of these approaches may be used to both provide ways to discard data and also provide redundant key paths in situations in which it may prove useful. Thus, in this context, in one embodiment, an "AND" scheme may, in one embodiment, involve using multiple encryptions, as previously discussed; whereas an "OR" scheme may, in one embodiment, involve encrypting a key with each parent key separately and storing the encrypted copy separately, or, alternatively, allowing a certain set of parent keys to be available. For example, any M out of N parents keys may be available, where N is greater than M, such as by representing the particular keys as a polynomial P(x) of degree M, evaluating P(x) for N distinct values of x, and then encrypting each result with the corresponding parent key. In this case, as long as M parent keys are present, e.g. Key 1 to Key M, for example, then the polynomial evaluated at M values may be recovered. From there the whole polynomial may be recovered and, hence, the key it represents. It is noted, of course, that this is simply one example of a technique for implementation an "OR" scheme and the claimed subject matter is not limited in scope to employing this approach. Many other approaches are possible and are included within the scope of the claimed subject matter.

In an alternate embodiment, a key management scheme may be employed to implement a time-based retention and/or data discard policy, as suggested above with respect to a data retention and/or data discard policy based at least in part on a set of parameters. As one example, a new retention key for the files created during a given week may be applied using a key hierarchy similar to the previously described key hierarchy. Likewise, retention keys may be discarded based on age. For example, if one retains the most recently created 52 retention keys and discards any older retention keys files one year old are effectively discarded. Likewise, if it is desired to extend the life of a particular file one may re-encrypt the file key with another retention key, such as just described. Thus, for the discarding of data that is based at least in part on time, in one embodiment, "weekly retention keys" may be employed. Of course, in alternative embodiments, this may be extended to "daily keys", "yearly keys", etc.

Likewise, in an alternative embodiment, a generalized key retention scheme may provide for keys that map to any number of different time intervals having any number of different durations. Likewise, such keys may be different in "type", in this context implying different retention policies. Likewise, such keys may furthermore belong to different key hierarchies. As one example, in such a system, a retention key may map to a specified time interval, but on expiration may not be discarded unless administrative action occurs. Such an approach may be desirable in a scheme to ensure that stored data is not inadvertently discarded before it is confirmed that the stored data is to be discarded. Likewise, retention keys may expire in an order unrelated to when they were created and/or may be employed to discard data from a specific time interval, while retaining data from other specific time intervals. Likewise, as previously described, for a given set of files, the retention key may be replaced by a new retention key so that the file key is re-encrypted, effectively discarding those files in which the file key was not re-encrypted.

In another embodiment, retention keys may correspond to a particular time of creation and, therefore, have a time of expiration, but belong to different key hierarchies in which the hierarchies are related at least in part to how long it is desired for the data to be retained. In yet another embodiment, keys from different levels in a particular key hierarchy may correspond to different levels of nested directories in a file system. For example, this may make it possible to discard a directory with all of its contents by discarding the key that maps to this directory from the hierarchy. Once the key is discarded, all keys encrypted by that key are discarded; hence all directories and files contained in the target directory may be discarded.

The embodiments described above, it may be noted, are independent of system architecture. Thus, it is not necessary that three layers be employed and it is not necessary that encryption and/or decryption be transparent to a particular layer; of course, embodiments that include such features are also within the scope of the claimed subject matter, as previously described.

As previously described, one disadvantage of state of the art technology is the ability, potentially, for an unauthorized entity or individual to gain access to data stored on and/or being processed, such as may occur in networking, for example. In this context, networking is typically implemented using at least two computing platforms. A computing platform refers to a system and/or a device that includes the ability to process and store data in the form of signals. Thus, a computing platform, in this context, may comprise hardware, software, firmware and/or any combination thereof.

Figure 3:
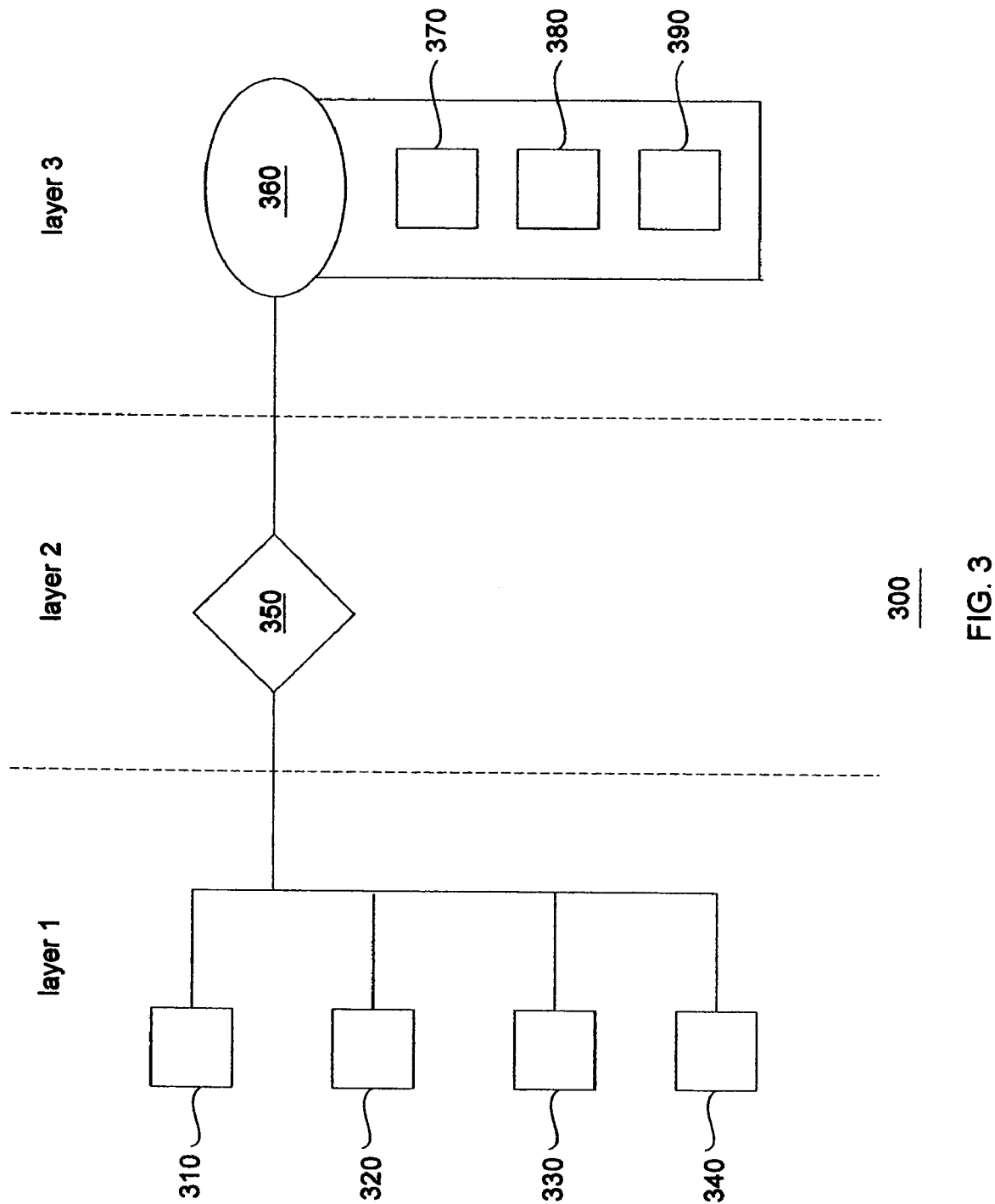
FIG. 3 is a schematic diagram of an embodiment of a portion network that may employ an embodiment of a method of managing the retention and/or discarding of stored data.

FIG. 3 is a schematic diagram illustrating an embodiment of a portion of a network that may employ an embodiment of a method of managing the retention and/or discarding of stored data. Reference numerals 310, 320, 330 and 340 denote units that access stored data. These may comprise, for example, clients, servers and the like. Reference numeral 360 denotes a file server that stores encrypted data. Also depicted in FIG. 3 is a directory of file server 360 that includes files respectively denoted 370, 380, and 390. These files, in this example, were encrypted by device 350. Therefore, as illustrated in FIG. 3, units 310-340 comprise previously described layer one, device 350 comprises previously described layer two, and server 360 comprises previously described layer three. Of course, this is merely an example embodiment and any one of a number of different network architectures may be employed that are within the scope of the claimed subject matter.

Figure 4:
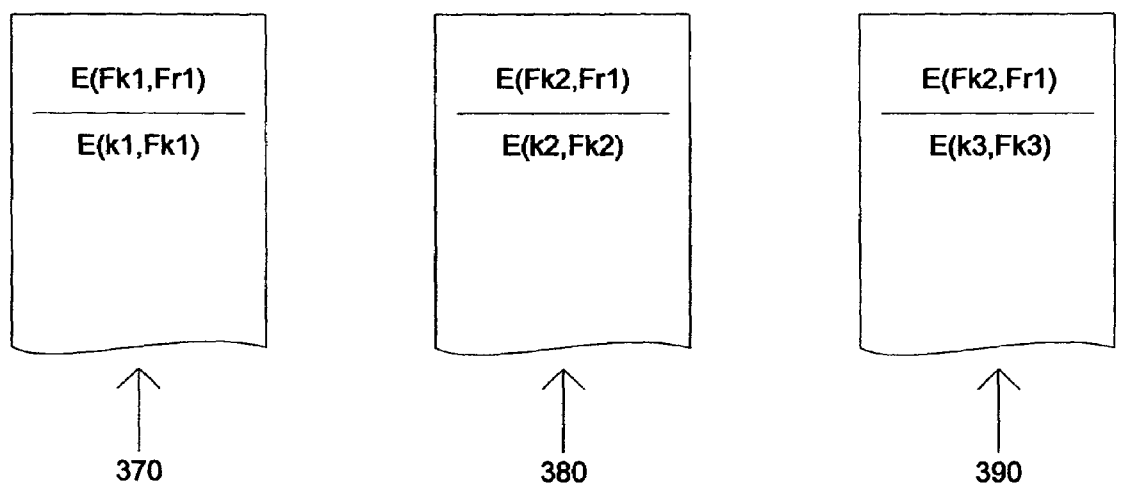
FIG. 4 is a schematic diagram illustrating an embodiment of a file structure for the embodiment shown in FIG. 3.

For this particular embodiment, files 370-390 are illustrated in more detail in FIG. 4. Here, the notation E(x,y) refers to an encryption process where data denoted as x is encrypted with a key denoted y. Thus, as illustrated, the contents of file 370, denoted k1, has been encrypted by file key Fk1. However, also stored in file 370 is key Fk1 having been encrypted by retention key Fr1. Likewise, retention key Fr1 has also been employed to encrypt the keys for files 380 ad 390. These keys are respectively denoted Fk2 and Fk3. Likewise, key Fk2 was employed to encrypt content k2 and Fk3 was employed to encrypt content k3. It is noted that other retention keys and a root key are not shown in this figure, although, depending upon the particular embodiment, the associated files and retention keys may follow a similar structure as previously described. For example, files 370-309 may also store encrypted retention keys.

One approach or technique that may be employed to make unauthorized access to data more difficult is the previously described embodiment. It is worth noting, in this context, that data storage may take any one of a variety of forms and the claimed subject matter is not limited in scope to any particular form of storing such data signals. Any and all methods and/or techniques for storing data signals now known or that may subsequently be developed are included within the scope of the claimed subject matter. As is well-known, there are a variety of file types and/or structures currently in use for storing data. In this context, a file includes stored data related at least in part by the particular format in which the data is stored. As just one example, most clients that employ a Unix-based operating system use the Network File System (NFS) for remote file access. Sun® Microsystems introduced NFS in 1985. Since then, it has become a de facto standard protocol, used by over ten million systems worldwide. NFS is particularly common on Unix-based systems, but NFS implementations are available for virtually every modern computing platform in current use, from desktops to supercomputers.

Although the NFS file system and Unix-based operating systems are specifically mentioned above, the issue of management of the retention and/or discarding of stored data may arise for systems other than those that employ Unix or NFS. Essentially, for any instance in which data is stored, this issue may arise. Thus, the scope of the claimed subject matter is not limited to a particular hardware platform, software platform, file type, data type, file structure, data structure, operating system, application, or the like. Furthermore, the claimed subject matter is not limited to a particular implementation of encryption or other security measures.

Referring, again, to the embodiment of FIG. 1, it is desired that encryption and/or decryption be transparent to a third layer, although, again, this is just an example embodiment. While in a previously described embodiment, encryption and/or decryption was assumed transparent to layer three, as previously indicated, this need not be the case in an alternative embodiment. For example, communications may take place between the layers to provide relevant and/or useful encryption and/or decryption information to layer three. Thus, information and/or data may be passed that may reduce the processing load for layer two, for example.

As previously described, embodiments of the claimed subject matter are well suited to a variety of networking applications and/or systems, such as computer network systems, employing a variety of different topologies, including, for example, storage area networking (SAN), although, of course, the claimed subject matter is not limited in scope in this respect. In such an embodiment, although the claimed subject matter is not limited in scope in this respect, a configuration may be employed in which management is accomplished of small, medium, or large networks comprised of storage devices, computers, other computing platforms, and/or the like, that are communicatively coupled to dissimilar storage devices, computers, other computing platforms, and/or the like.

Figure 5:
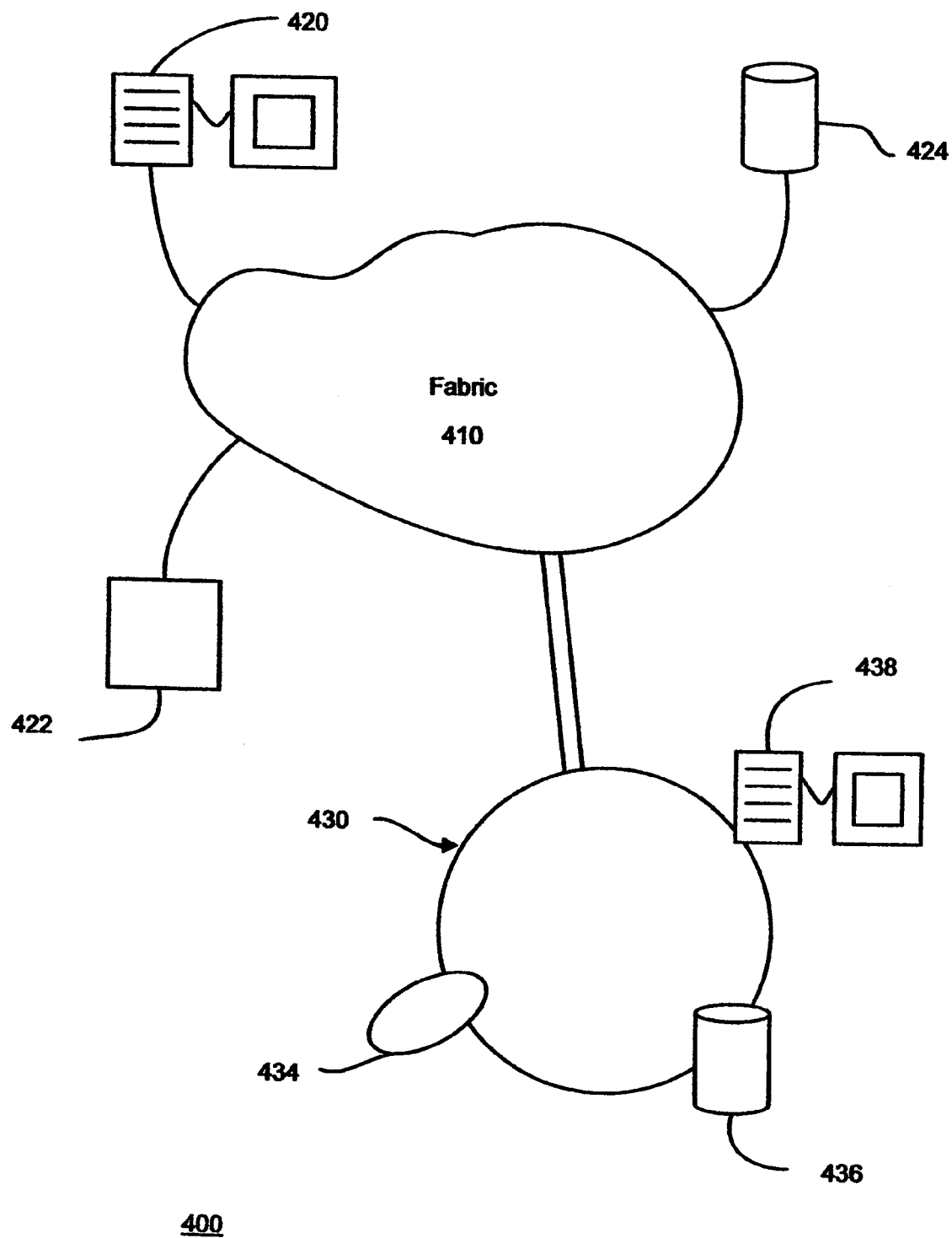
FIG. 5 is a schematic diagram of another embodiment of a network that may employ and embodiment of a method of managing the retention and/or discarding of stored data.

FIG. 5 is a schematic diagram of an example embodiment of a communications network system 400 that may employ an embodiment in accordance with the claimed subject matter. In this example, embodiment 500 comprises a switched fabric 410 and a plurality of devices, such as 420, 422, 424, and/or groups of devices, such as 434, 436, and 438, as indicated with respect to a logical loop 430, for example. References to "a switch" or to "switches" are intended to refer to a generic switch. In this context, then, the term switch includes a device having at least a processor and memory in which the device is adapted to or has the capability to route frames or packets between two or more separate, other devices. In general, a switched fabric, such as fabric 410, may be communicatively coupled to various devices, such as, here, 420, 422, and 424, and may operate as a switching network to allow these devices to communicate with one another. Devices 420, 422, and 424 may comprise any type of device, such as, for example, a computing platform, a storage device, and/or the like, and may be communicatively coupled via fabric 410 by employing point-to-point communications technology or techniques, as one example. In this particular embodiment, fabric 410 comprises a variety of communicatively coupled switches. In this particular embodiment, fabric 410 is also in communication with logical loop 430. Loop 430 here includes devices 434, 436 and 438. In this particular embodiment, loop 430 comprises an arbitrated loop with ring couplings for providing multiple nodes with the ability to arbitrate access to shared bandwidth. It is, of course, appreciated that this description is merely an illustrative example and the claimed subject matter is not limited in scope in any way to this particular embodiment.

As another example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example. It will, of course, be understood that, although particular embodiments have just been described, the claimed subject matter is not limited in scope to a particular embodiment or implementation.

In the preceding description, various aspects of the claimed subject matter have been described. For purposes of explanation, specific numbers, systems and configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method for making data stored in a computer data storage system unrecoverable, comprising:

providing a data storage computer system for storing a data originating from a plurality of files stored by one or more client computers as the stored data, the stored data being stored in permanent storage devices by the data storage computer system;

providing a root key;

providing a first retention key;

providing a first file key;

encrypting a first data file using the first file key;

encrypting the first file key using the first retention key to make a first encrypted file key, and storing the first encrypted file key;

encrypting the first retention key using the root key to make a first encrypted retention key, and storing the encrypted retention key;

encrypting a plurality of additional first data files using a first selected file key for each additional data file;

encrypting each first selected file key by the first retention key to form an encrypted first selected file key, and storing each encrypted first selected file key;

discarding the first data file by destroying the first encrypted file key; and discarding the plurality of additional first data files by destroying the first encrypted retention key;

using a delete function to mark one or more particular encrypted files of a selected group of files as deleted (hereinafter the deleted files), where each file of the selected group of files is encrypted by a respective file encryption key, each respective file encryption key being encrypted by an old retention key;

recovering one or more respective file encryption key(s) corresponding to one or more particular encrypted file(s) of the selected group of files not marked as deleted by un-encrypting the corresponding one or more respective file encryption key(s) using the old retention key;

re-encrypting the recovered file encryption key(s) using a new retention key; and discarding the deleted files by destroying the old retention key, while retaining all files of the group of files which were not marked as deleted by retaining the re-encrypted file encryption key(s) and the new retention key.

2. The method of claim 1, further comprising:

encrypting a second data file using a second file key;

encrypting the second file key using a second retention key to make a second encrypted file key, and storing the second encrypted file key;

encrypting the second retention key using the root key to make a second encrypted retention key, and storing the second encrypted retention key; and discarding the second data file by destroying the second encrypted file key.

3. The method of claim 2, further comprising:

discarding the second data file by destroying the second encrypted retention key.

4. The method of claim 2, further comprising:

discarding the first data file, the plurality of additional first data files, and the second data file by destroying the root key.

5. A method for operating a computer data storage system, comprising:

providing a plurality of file keys, each file key of the plurality of file keys used to encrypt at least one data file, and storing the at least one data file on a data storage device;

providing a plurality of retention keys, each retention key used to encrypt selected ones of the file keys;

providing a root key, the root key used to encrypt each retention key of the plurality of retention keys to make an encrypted retention key of each of the plurality of retention keys, and storing each of the encrypted retention keys;

using the encrypted file key to both encrypt the data file and decrypt the data file after the encrypted file key is decrypted by its retention key;

decrypting the encrypted file key by its retention key after the retention key is decrypted by the root key;

discarding one or more data files by discarding at least one encrypted key which must be decrypted in order to decrypt the data file;

using a delete function to mark one or more particular encrypted files of a selected group of files as deleted (hereinafter the deleted files), where each file of the selected group of files is encrypted by a respective file encryption key, each respective file encryption key being encrypted by an old retention key;

recovering one or more respective file encryption key(s) corresponding to one or more particular encrypted file(s) of the selected group of files not marked as deleted by un-encrypting the corresponding one or more respective file encryption key(s) using the old retention key;

re-encrypting the recovered file encryption key(s) using a new retention key; and discarding the deleted files by destroying the old retention key, while retaining all files of the group of files which were not marked as deleted by retaining the re-encrypted file encryption key(s) and the new retention key.

6. The method of claim 5, further comprising:

storing the encrypted retention keys in a storage media separate from the data storage device.

7. The method of claim 5, further comprising:

discarding an encrypted key by physically destroying a data storage media on which the encrypted key is stored.

8. The method of claim 5, further comprising:

discarding an encrypted key by deleting the encrypted key from a computer storage media, where the deletion renders the encrypted key not recoverable.

9. The method of claim 5, further comprising:

discarding an encrypted key by changing a key which must be decrypted in order to decrypt the encrypted key.

10. The method of claim 5, further comprising:

maintaining a file structure, and storing in the file structure an encrypted file and an encrypted file key used to encrypt the encrypted file, the file structure stored on the data storage device.

11. The method of claim 10, further comprising:

storing the encrypted retention keys on a media separate from the data storage device.

12. The method of claim 11, further comprising:

maintaining the media so that the encrypted retention key may be destroyed.

13. The method of claim 11, further comprising:

maintaining the media so that the media may be easily destroyed.

14. A computer data storage system apparatus, comprising:

a data storage device;

a processor configured to execute software to, provide a plurality of file keys, each file key of the plurality of file keys used to encrypt at least one data file, and storing the at least one data file on the data storage device;

provide a plurality of retention keys, each retention key used to encrypt selected ones of the file keys;

provide a root key, the root key used to encrypt each retention key of the plurality of retention keys to make an encrypted retention key of each of the plurality of retention keys, and storing each of the encrypted retention keys;

use the encrypted file key to both encrypt the data file and decrypt the data file after the encrypted file key is decrypted by its retention key;

decrypt the encrypted file key by its retention key after the retention key is decrypted by the root key;

discard one or more data files by discarding at least one encrypted key which must be decrypted in order to decrypt the data file;

use a delete function to mark one or more particular encrypted files of a selected group of files as deleted (hereinafter the deleted files), where each file of the selected group of files is encrypted by a respective file encryption key, each respective file encryption key being encrypted by an old retention key;

recover one or more respective file encryption key(s) corresponding to one or more particular encrypted file(s) of the selected group of files not marked as deleted by un-encrypting the corresponding one or more respective file encryption key(s) using the old retention key:

re-encrypt the recovered file encryption key(s) using a new retention key; and discard the deleted files by destroying the old retention key, while retaining all files of the group of files which were not marked as deleted by retaining the re-encrypted file encryption key(s) and the new retention key.

15. The apparatus as in claim 14, further comprising:
the processor adapted to store the encrypted retention keys in a storage media separate from the data storage device.

16. The apparatus as in claim 14, further comprising:
physically destroying a data storage media on which the encrypted key is stored to discard the encrypted key.

17. The apparatus as in claim 14, further comprising:
the processor adapted to discard an encrypted key by deleting the encrypted key from a computer storage media, where the deletion renders the encrypted key not recoverable.

18. The apparatus as in claim 14, further comprising:
the processor adapted to discard an encrypted key by changing a key which must be decrypted in order to decrypt the encrypted key.

19. The apparatus as in claim 14, further comprising:
the processor adapted to maintain a file structure, and to store in the file structure an encrypted file and an encrypted file key used to encrypt the encrypted file, the file structure stored on the data storage device.

20. The apparatus as in claim 19, further comprising:
the processor adapted to store the encrypted retention keys on a media separate from the data storage device.

21. The apparatus as in claim 20, further comprising:
the processor adapted to maintain the media so that the encrypted retention key may be destroyed.

22. The apparatus as in claim 20, further comprising:
the media used for storing the encrypted retention key may be destroyed.

23. A computer readable storage media, comprising:
said computer readable storage media containing instructions for execution on a processor for a method of operating a computer data storage system, having, providing a plurality of file keys, each file key of the plurality of file keys used to encrypt at least one data file, and storing the at least one data file on a data storage device;

providing a plurality of retention keys, each retention key used to encrypt selected ones of the file keys;

providing a root key, the root key used to encrypt each retention key of the plurality of retention keys to make an encrypted retention key of each of the plurality of retention keys, and storing each of the encrypted retention keys;

using the encrypted file key to both encrypt the data file and decrypt the data file after the encrypted file key is decrypted by its retention key;

decrypting the encrypted file key by its retention key after the retention key is decrypted by the root key; and discarding one or more data files by discarding at least one encrypted key which must be decrypted in order to decrypt the data file;

using a delete function to mark one or more particular encrypted files of a selected group of files as deleted (hereinafter the deleted files), where each file of the selected group of files is encrypted by a respective file encryption key, each respective file encryption key being encrypted by an old retention key;

recovering one or more respective file encryption key(s) corresponding to one or more particular encrypted file(s) of the selected group of files not marked as deleted by un-encrypting the corresponding one or more respective file encryption key(s) using the old retention key;

re-encrypting the recovered file encryption key(s) using a new retention key; and discarding the deleted files by destroying the old retention key, while retaining all files of the group of files which were not marked as deleted by retaining the re-encrypted file encryption key(s) and the new retention key.

* * * * *